United States Patent
Yu

(10) Patent No.: US 8,927,177 B2
(45) Date of Patent: Jan. 6, 2015

(54) METHODS FOR PREPARING CARBON BLACK SHEET WITH METALLIC NANOPARTICLE THIN LAYER BY ELECTROPHORESIS DEPOSITION AND MEMBRANE ELECTRODE ASSEMBLY (MEA) FOR PROTON EXCHANGE MEMBRANE FUEL CELL

(75) Inventor: Yeon Tae Yu, Jeonju-si (KR)

(73) Assignee: Industrial Cooperation Foundation Chonbuk National University, Jeollabuk-Do (KR)

( * ) Notice: Subject to any disclaimer, the term of this patent is extended or adjusted under 35 U.S.C. 154(b) by 444 days.

(21) Appl. No.: 13/146,301

(22) PCT Filed: Jul. 21, 2009

(86) PCT No.: PCT/KR2009/004037
§ 371 (c)(1),
(2), (4) Date: Jul. 26, 2011

(87) PCT Pub. No.: WO2010/087556
PCT Pub. Date: Aug. 5, 2010

(65) Prior Publication Data
US 2011/0287337 A1 Nov. 24, 2011

(30) Foreign Application Priority Data
Jan. 30, 2009 (KR) .................. 10-2009-0007202

(51) Int. Cl.
| H01M 4/36 | (2006.01) |
| C25D 5/18 | (2006.01) |
| C25D 5/54 | (2006.01) |
| C25D 15/00 | (2006.01) |
| H01M 4/86 | (2006.01) |
| H01M 4/88 | (2006.01) |
| H01M 4/92 | (2006.01) |
| H01M 8/10 | (2006.01) |

(52) U.S. Cl.
CPC .. *C25D 5/18* (2013.01); *C25D 5/54* (2013.01); *C25D 15/00* (2013.01); *H01M 4/8605* (2013.01); *H01M 4/8853* (2013.01); *H01M 4/926* (2013.01); *H01M 2008/1095* (2013.01); *Y02E 60/50* (2013.01)
USPC .......................................................... 429/532

(58) Field of Classification Search
CPC . H01M 4/8853; H01M 4/926; H01M 4/8657; H01M 4/96; H01M 4/881; C25D 5/18; C25D 5/54; B82Y 30/00
USPC ......... 429/524, 529, 532, 530, 492, 483, 535; 205/105; 977/948
See application file for complete search history.

(56) References Cited

U.S. PATENT DOCUMENTS

2009/0075157 A1* 3/2009 Pak et al. .................. 429/44

FOREIGN PATENT DOCUMENTS

| JP | 9-265993 A | 10/1997 |
| JP | 2005-259513 A | 9/2005 |
| JP | 2006-59756 A | 3/2006 |
| JP | 2008-123985 A | 5/2008 |

OTHER PUBLICATIONS

International Search Report dated Mar. 9, 2010.

* cited by examiner

*Primary Examiner* — Raymond Alejandro
(74) *Attorney, Agent, or Firm* — McClure, Qualey & Rodack, LLP

(57) ABSTRACT

A carbon black sheet with a thin layer of metal nanoparticles is provided by pulse electroplating, which allows metal nanoparticles such as platinum to be uniformly dispersed on a carbon black layer and is very thin, enhancing the efficiency of a metal catalyst such as platinum. The process is also used to form a polymer membrane electrode assembly (MEA) for a fuel cell.

13 Claims, 10 Drawing Sheets

METHODS FOR PREPARING CARBON BLACK SHEET WITH METALLIC NANOPARTICLE THIN LAYER BY ELECTROPHORESIS DEPOSITION AND MEMBRANE ELECTRODE ASSEMBLY (MEA) FOR PROTON EXCHANGE MEMBRANE FUEL CELL

CROSS-REFERENCE TO RELATED APPLICATION

This application is a co-pending application which claims priority to PCT Application No. PCT/KR2009/004037, filed Jul. 21 2009, which claims priority to and the benefit of Korean Patent Application No. 10-2009-0007202, filing date Jan. 30, 2009 both of which are incorporated by reference in their entirety.

TECHNICAL FIELD

The present invention relates to a manufacturing method of a carbon black sheet which is very thin by uniformly dispersing metal nanoparticles such as platinum, etc. on a carbon black layer using pulse electroplating, and a membrane electrode assembly (MEA) for a fuel cell by using a carbon black sheet manufactured thereby.

BACKGROUND ART

A polymer electrolyte membrane fuel cell largely consists of an end plate, a current collector plate, a bi-polar plate, a gas diffusion layer, a metal nanoparticle catalyst layer, and a polymer electrolyte membrane, and among them, a gas diffusion layer of positive and negative electrodes, a platinum-supported carbon black catalyst layer of positive and negative electrodes, and a polymer electrolyte membrane are collectively called a membrane electrode assembly (MEA).

This MEA takes up about 70% of a material cost of a polymer electrolyte membrane fuel cell stack and is the biggest obstacle to the commercialization of a polymer electrolyte membrane fuel cell. In addition, the platinum catalyst among elements constituting the MEA takes up the highest portion of the price. Accordingly, the US Department of Energy (DOE) sets a goal that the amount of platinum (Pt) used will be reduced from about 0.3 mg/cm$^2$ in the current level to 0.05 mg/cm$^2$ or less by 2025.

In order to reduce the amount of platinum used, it is necessary to thin the thickness of a platinum catalyst layer and concentrate the platinum catalyst to regions adjacent to a membrane layer such that a catalytic reaction which ionizes hydrogen may usually occur between the catalyst layer and the membrane layer. However, a platinum layer may not be selectively formed on a specific site in the catalyst layer by a spray method or a decal method, which is a conventional method of forming a platinum nanoparticles catalyst layer.

Specifically, the platinum nanoparticle catalyst layer of a conventional polymer electrolyte membrane fuel cell was manufactured by dispersing a carbon black power in a platinum compound aqueous solution, adding a reducing agent to the dispersion to reduction-deposit platinum nanoparticles on the carbon black 10, separating the platinum-supported carbon black from the solution to wash the platinum-supported carbon black, mixing the platinum-supported carbon black with a mixed solution of the polymer electrolyte solution and a solvent to prepare a platinum-supported carbon black slurry 130, applying the slurry on a carbon paper 140 as a gas diffusion layer by a spray method or a decal method to manufacture platinum nanoparticle-supported carbon black sheet electrodes 140 and 150, installing the platinum-supported carbon black sheet manufactured on and below a polymer electrolyte membrane (M) of a membrane electrode assembly (MEA), and using a high temperature press to perform a hot pressing (100° C.).

In order to be immobilized on a carbon paper which is a gas diffusion layer in the manufacturing process of a platinum catalyst layer, the platinum-supported carbon black powder is suspended in a Nafion solution which is a polymer electrolyte to be applied on the carbon paper by a spray method or a decal method. In this case, the platinum metal catalyst is buried in the polymer electrolyte as in FIG. 2 to fail to exhibit the performance of the catalyst sufficiently. Due to these problems, a platinum catalyst layer was applied thicker than necessary, and as a result, this has been responsible for the inability to reduce the amount of a platinum catalyst used.

DISCLOSURE

Technical Problem

In order to solve these conventional problems, the present invention provides a method of manufacturing a thin layer of metal nanoparticles by dispersing metal nanoparticles on a carbon black layer uniformly.

Technical Solution

In order to achieve the above-mentioned object, the present invention provides a method of preparing a carbon black sheet, the method including: forming a carbon black layer on a surface of a carbon paper; and forming a metal nanoparticle layer on the carbon black layer by pulse electroplating wherein a colloid suspension of metal nanoparticles is used as an electrolyte and pulse electric power is applied for electrolysis to deposit the metal nanoparticles on the carbon black sheet.

The colloid suspension of metal particles have a pH of 6 or less.

A complex metal nanoparticle thin layer is formed by using a nanoparticle suspension electrolyte of a metal different from the metal used on the metal nanoparticle layer and by subjecting the different metal nanoparticles on the metal nanoparticle layer to electrophoresis deposition.

An amount of the metal nanoparticles deposited by the pulse electroplating is controlled by controlling the current density and dwell time of electric power applied, the concentration of metal nanoparticles in the suspension, pH, temperature, and kind and concentration of the metal nanoparticle Hereinafter, a carbon black sheet of a metal nanoparticles thin layer of the present invention, a manufacturing method thereof, and a membrane electrode assembly (MEA) for a fuel cell will be described in detail.

FIG. 3 is a view illustrating the manufacturing process of an MEA of the present invention.

A method of manufacturing a carbon black sheet with a thin layer of metal nanoparticles includes coating a carbon black layer 330 on the surface of a carbon paper 310, and forming a metal nanoparticle layer on the carbon black layer 330 by electrophoresis deposition wherein a colloid suspension of metal nanoparticles is used as an electrolyte.

First, a carbon black is suspended in a polymer electrolyte solution such as a Nafion solution, etc. to prepare a carbon black slurry, and the carbon black slurry is applied on the surface of the carbon paper 310 which is a gas diffusion layer by method such as a spray method or a decal method to obtain a carbon black sheet with the carbon black layer 330 formed on the carbon paper 310.

When the carbon black is mixed with the polymer electrolyte solution, it is preferable to use an ultrasonic stirrer for stirring. It is also preferable to press the carbon black layer 330 and the carbon paper 310 by using a high temperature press in order to enhance the adhesion between the carbon black layer 330 and the carbon paper 310.

FIG. 4 is a view illustrating an applied current mode of pulse electroplating, and FIG. 5 is a view illustrating an applied current mode of direct current electroplating.

Next, a metal nanoparticle thin layer is formed by using a suspension electrolyte of colloidal nanoparticles as electrolyte and depositing metal nanoparticles on the carbon black layer by electrophoresis.

A suspension electrolyte of colloidal nanoparticles is a mixture of a metal nanoparticle colloid and an electrolyte solution. A metal nanoparticle material of the metal nanoparticle colloid may include all metals, such as a noble metal such as platinum (Pt), gold (Au), etc., a common metal, an alloy, etc., and complex metal nanoparticles thereof may be also used.

In the pulse electroplating, an electrolyte solution in which metal nanoparticle colloids are suspended is used as an electrolyte, the carbon black sheet manufactured is employed as a negative electrode, and metal nanoparticles are deposited and supported on the carbon black layer of the carbon black sheet by the pulse electroplating process.

Specifically, the surfaces of metal nanoparticles in the metal nanoparticle colloid are negatively charged in the solution and thus the colloidal state may be maintained. Hydrogen ions ($H^+$) are present in the aqueous solution and thus these hydrogen ions surround the surfaces of colloidal metal nanoparticles to form an electrical double layer. This colloidal electrolyte is used for a carbon black sheet in the negative electrode and a platinum plate in the positive electrode and pulse electric power is applied for electrolysis to deposit metal nanoparticles on the carbon black sheet as a negative electrode along with hydrogen by electrophoresis. In this case, pulse electric power, which is a mode of supplying the direct current intermittently at a constant interval, is applied to deposit metal nanoparticles. Thus, metal nanoparticles are uniformly deposited in the form of a thin layer on the carbon black layer. In FIG. 4, $t_{on}$ is the time for which the direct current is supplied, $t_{off}$ is the time for which the supply of direct current power is stopped, $I_{on}$ is the current density of direct current power supplied, and $I_{off}$ is the current density when direct current power is blocked.

However, when direct current power is applied to deposit metal nanoparticles as in FIG. 5 in a different way as compared to the method of the present invention, a great number of nanoparticles are deposited while being aggregated, and thus a metal nanoparticle thin layer with a uniform thin layer may not be obtained.

It is desirable to maintain pH at a value of 6 or less such that the metal nanoparticles of the metal nanoparticle suspension electrolyte may be easily deposited. The pH of the metal nanoparticle suspension electrolyte may be adjusted by adding sulfuric acid, sodium hydroxide, etc.

The electrophoresis deposition is advantageous in that metal nanoparticles may be supported on the carbon black layer of the carbon black sheet to manufacture a metal nanoparticle catalyst layer in the form of a thin layer. Further, the amount and shape of metal nanoparticles supported may be easily controlled by controlling the current density and dwell time of pulse electric power, the concentration of metal nanoparticles in electrolyte, pH, temperature, and kind and concentration of electrolyte, and thus electrophoresis deposition may be used as a means to develop a new catalyst and an MEA for a fuel cell.

In addition, the carbon black sheet may be continuously supplied to the metal nanoparticle suspension electrolyte, and thus a carbon black sheet electrode may be commercialized by a continuous process of manufacturing a carbon black sheet on which a metal nanoparticle thin layer is continuously formed.

Moreover, a process of supporting metal nanoparticles is performed after the carbon black layer of the carbon black sheet is manufactured and metal nanoparticles may be formed on the carbon black of the carbon black sheet while metal nanoparticles are not buried in the polymer electrolyte to maximize the efficiency of the metal catalyst and minimize the amount of metals used, leading to the significant reduction of manufacturing costs.

FIG. 6 is a view illustrating the structure of an MEA manufactured by the present invention. A polymer electrolyte membrane (M) included between carbon black sheets 310, 330 having the metal nanoparticle thin layer thus manufactured may be subjected to pressing using a high temperature press to obtain an MEA for a fuel cell.

FIG. 7 is a view illustrating the structure of an MEA manufactured by using a carbon black sheet with a plurality of layers of a metal nanoparticle thin layer. A plurality of layers of a metal nanoparticle thin layer may be formed by once or more repeating the process of coating a metal nanoparticle thin layer on the carbon black layer of the carbon black sheet by pulse electroplating, applying a carbon black slurry thereon to form a carbon black layer, and using electrophoresis to deposit metal nanoparticles on the carbon black layer once again formed by pulse electroplating. A polymer electrolyte membrane (M) included between carbon black sheets 310, 330 with a plurality of layers of a metal nanoparticle thin layer thus manufactured may be subjected to pressing using a high temperature press to obtain an MEA for a fuel cell as in FIG. 7.

FIG. 8 is a view illustrating the structure of an MEA manufactured by using a carbon black sheet with multiple metal nanoparticle thin layers at various concentrations.

In addition, a complex metal nanoparticle thin layer may be formed by using a nanoparticle suspension electrolyte of a metal different from the metal used on the metal nanoparticle thin layer as an electrolyte and subjecting the different metal nanoparticles on the metal nanoparticle thin layer to electrophoresis deposition. A polymer electrolyte membrane (M) included between carbon black sheets 310, 330 with the complex metal nanoparticle thin layer thus manufactured may be subjected to pressing using a high temperature press to obtain a complex catalyst layer MEA for a fuel cell. A complex metal nanoparticle catalyst layer may be easily manufactured by only changing the kind of a metal nanoparticle suspended in an electrolyte during pulse electroplating.

Advantageous Effects

Unlike conventional manufacturing methods, a manufacturing method of a carbon black sheet with a thin layer of metal nanoparticles of the present invention allows metal nanoparticles such as platinum, etc. to be uniformly dispersed on a carbon black layer and manufactured into a thin layer, enhancing the efficiency of a metal catalyst such as platinum, etc. and minimizing the amount of the metal used to reduce the manufacturing costs significantly.

Further, a carbon black sheet with a multi-layer structure or a thin layer of different metal nanoparticles may be manufactured and thus its usage may be maximized.

In addition, because the present invention employs a pulse electroplating process based on a deposition process using electrophoresis, carbon black sheets may be continuously supplied to the pulse electroplating process to manufacture a carbon black sheet with a metal nanoparticle thin layer by a continuous process, leading to easy manufacturing of a large carbon black sheet electrode and its mass production to contribute greatly to the commercialization of fuel cells.

BEST MODE

Hereinafter, the present invention will be described in more detail with reference to Examples. However, the scope of the present invention is not limited to the following Examples.

Example 1

In order to prepare a carbon black slurry, 3 ml of $H_2O$, 2 ml of isopropyl alcohol (IPA), and a polymer electrolyte were mixed with 1 g of carbon black, and the mixture was subjected to ultrasonic stirring. A Nafion solution was used as a polymer electrolyte solution, carbon black was mixed with the Nafion solution to have 20% by weight of the Nafion solution, and the mixture was stirred under ultrasonic agitation for 50 min to prepare a carbon black slurry. An air-gun spray was used to apply the carbon black slurry on a carbon paper with an area of 100×100 mm, the carbon black layer and the carbon paper were pressed under a load of 100 Kgf/cm$^2$ at 100° C. by using a high temperature press to prepare a carbon black sheet electrode. The carbon black sheet thus manufactured was cut into a size of 1×2 mm and was used as an electrode for pulse electroplating process.

$H_2PtCl_6 6H_2O$ and sodium citrate were used as a starting material for synthesis of a platinum colloid to be added to the electrolyte solution and a reducing agent, respectively. 5% of $H_2PtCl_6 6H_2O$ was first prepared to synthesize the platinum colloid and 5 ml of $H_2PtCl_6 6H_2O$ was diluted in 195 ml of water. The resulting aqueous solution was heated to about 90° C., at which 45 ml of 1% sodium citrate was added to the solution, the mixture was vigorously stirred with a magnetic bar, and the temperature was maintained for 4 hours after the addition to obtain a platinum colloid with a size of 3 to 4 nm.

In order to deposit platinum nanoparticles on the electrode of the carbon black sheet, a platinum plate was used as a counter electrode and the distance between the negative and positive electrodes was maintained at 10 cm. A saturated calomel electrode (sat'd KCl: SCE) was used as a reference electrode. A mixed solution of 1 M $H_2SO_4$ and 1 M $CH_3OH$ was used as an electrolyte. 50 ml of the platinum nanoparticle colloid prepared above was mixed with 200 ml of the electrolyte solution to be used as a platinum nanoparticle suspension electrolyte.

In the pulse electroplating process, platinum nanoparticles were deposited while maintaining $I_{on}$ and $I_{off}$ at 30 mA/cm$^2$ and 0 mA/cm$^2$, respectively, setting $t_{on}$ at 0.25 second, and changing the pH of the platinum nanoparticle suspension electrolyte within a range of 2 to 10, and as a result, a carbon black sheet with a thin layer of platinum nanoparticles was manufactured. In this case, the pH of the platinum nanoparticle suspension electrolyte was adjusted by using sulfuric acid and sodium hydroxide.

Figure 1:
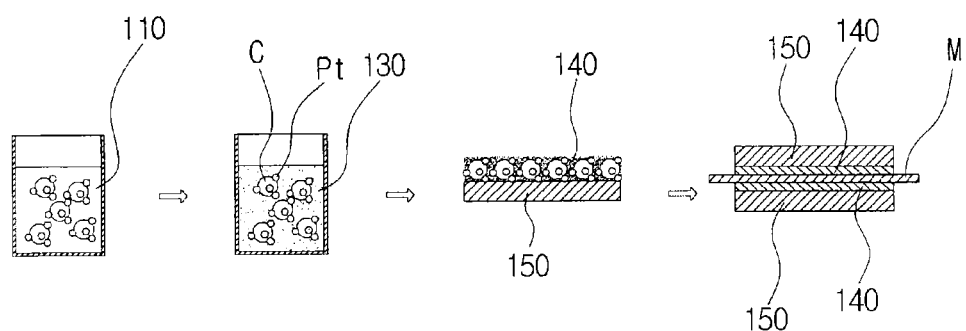
FIG. 1 is a view illustrating the manufacturing process of a conventional membrane electrode assembly (MEA).
Figure 2:
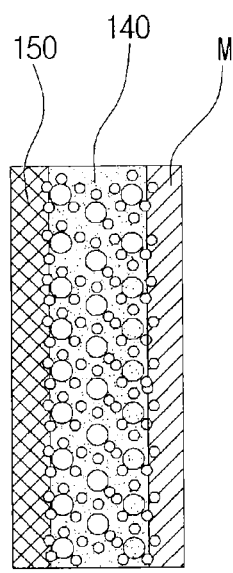
FIG. 2 is a view illustrating the structure of an MEA manufactured by a conventional method.
Figure 3:
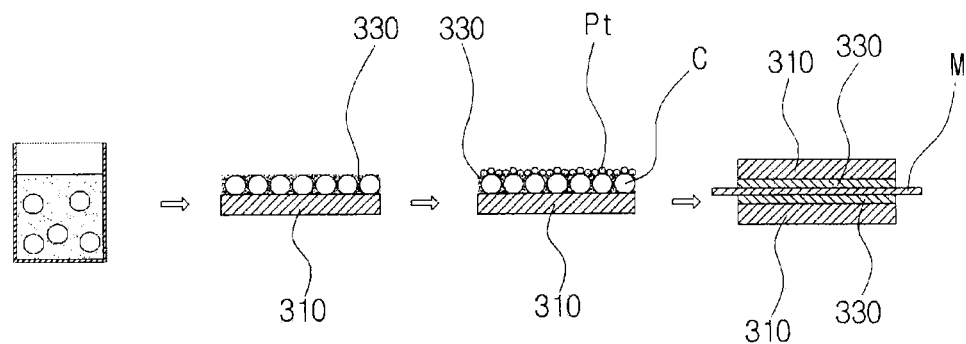
FIG. 3 is a view illustrating the manufacturing process of an MEA of the present invention.
Figure 4:
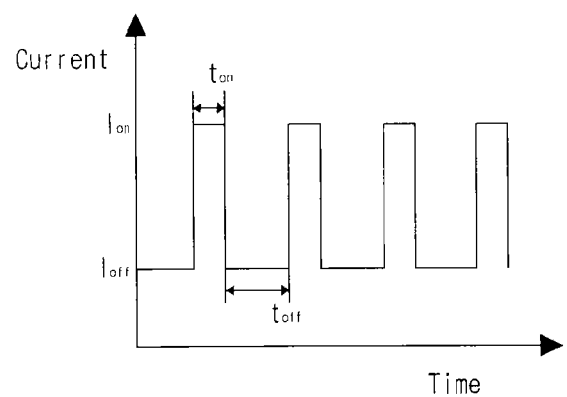
FIG. 4 is a view illustrating an applied current mode of pulse electroplating.
Figure 5:
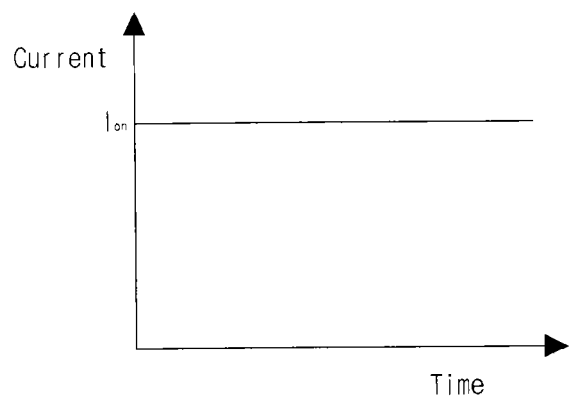
FIG. 5 is a view illustrating an applied current mode of direct current electroplating.
Figure 6:
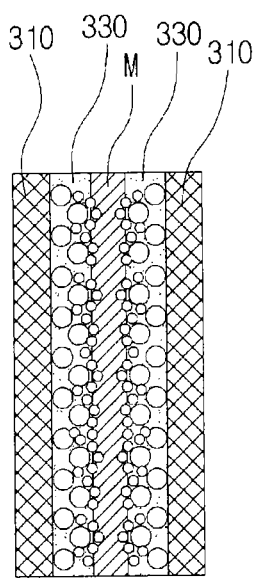
FIG. 6 is a view illustrating the structure of an MEA manufactured by the present invention.
Figure 7:
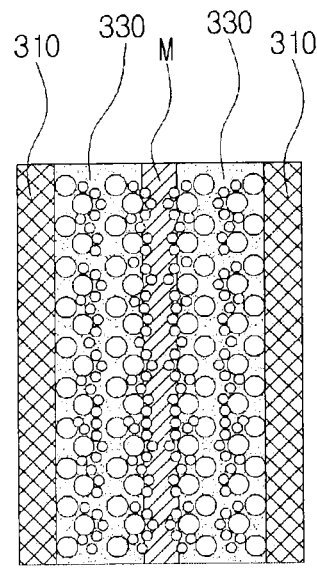
FIG. 7 is a view illustrating the structure of an MEA manufactured by using a carbon black sheet with a plurality of layers of a metal nanoparticle thin layer.
Figure 8:
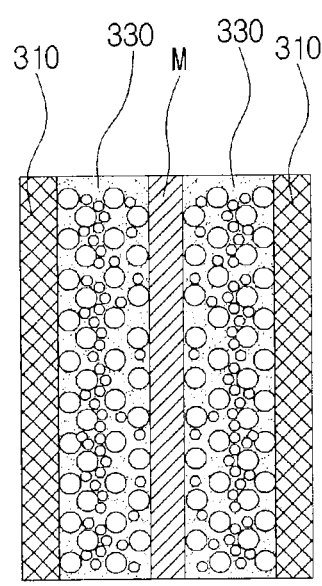
FIG. 8 is a view illustrating the structure of an MEA manufactured by using a carbon black sheet with a different metal nanoparticle thin layer.
Figure 9:
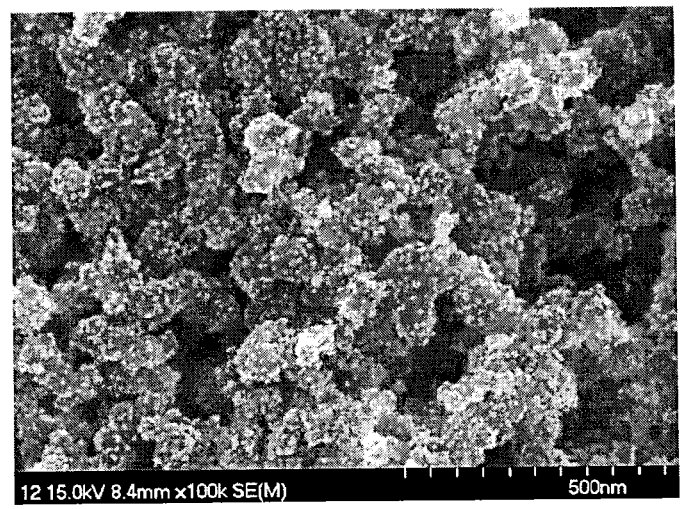
FIG. 9 is a scanning electron microscope (SEM) image of a carbon black sheet (Pt/C) manufactured by using a metal nanoparticle suspension electrolyte with a pH of 2 in Example 1.
Figure 10:
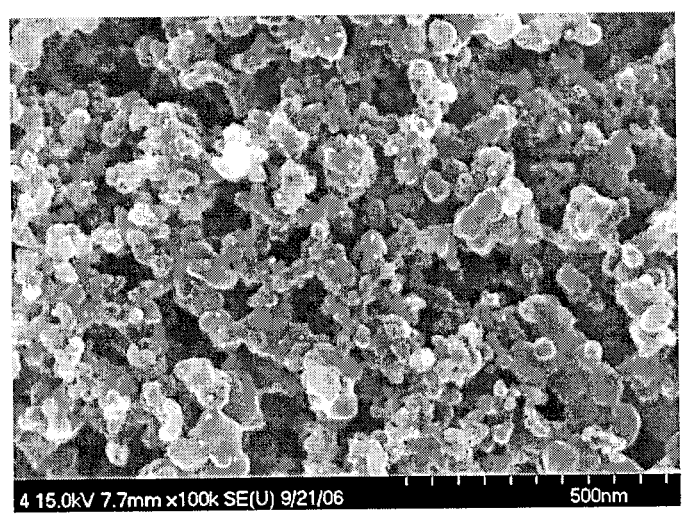
FIG. 10 is an SEM image of a carbon black sheet (Pt/C) manufactured by using manufactured by using a metal nanoparticle suspension electrolyte with a pH of 5 in Example 1.
Figure 11:
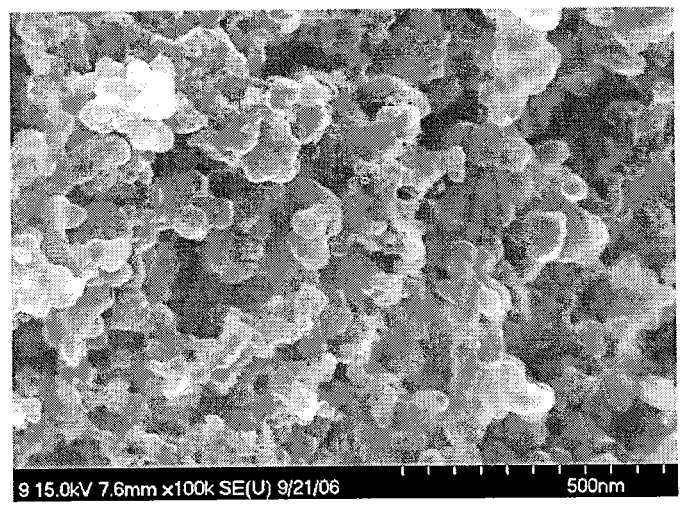
FIG. 11 is an SEM image of a carbon black sheet (Pt/C) manufactured by using manufactured by using a metal nanoparticle suspension electrolyte with a pH of 10 in Example 1.
Figure 12:
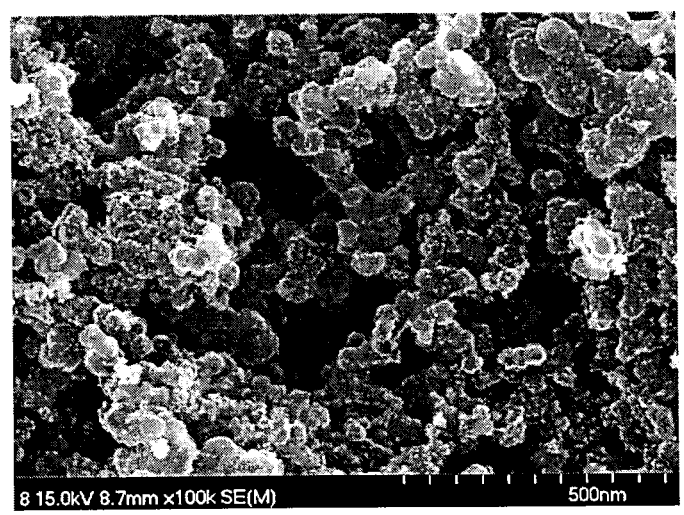
FIG. 12 is an SEM image of a carbon black sheet (Pt/C) manufactured with a dwell time of 0.15 in a pulse electroplating in Example 2.
Figure 13:
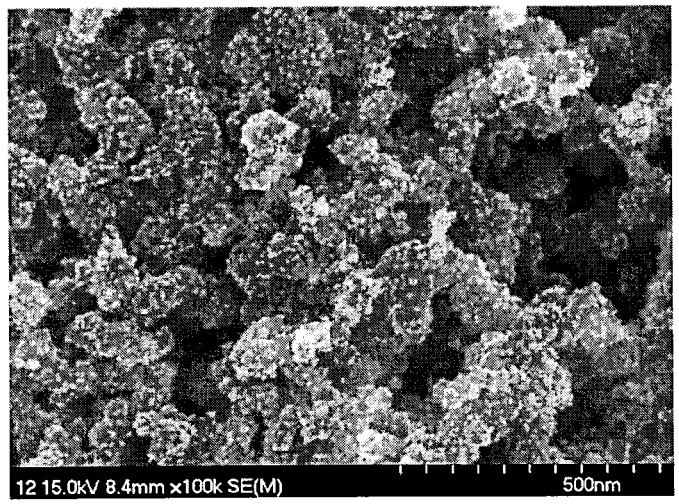
FIG. 13 is an SEM image of a carbon black sheet (Pt/C) manufactured with a dwell time of 0.25 in a pulse electroplating in Example 2.
Figure 14:
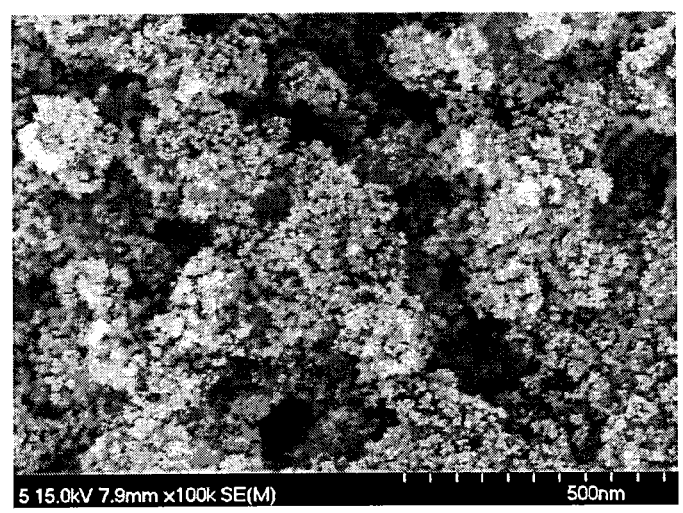
FIG. 14 is an SEM image of a carbon black sheet (Pt/C) manufactured with a dwell time of 0.5 in a pulse electroplating in Example 2.
Figure 15:
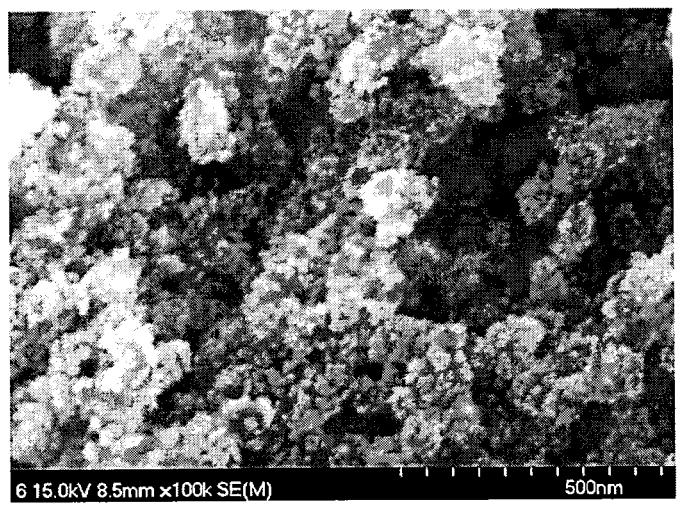
FIG. 15 is an SEM image of a carbon black sheet (Pt/C) manufactured with a dwell time of 0.75 in a pulse electroplating in Example 2.

FE-SEM images of carbon black sheets with a thin layer of platinum nanoparticles prepared at pH of 2, 5, and 10 are shown in FIGS. 9 to 11.

As shown from a SEM image in FIG. 11, platinum nanoparticles were not smoothly deposited at pH of 10, and it was confirmed from SEM images in FIGS. 9 and 10 that platinum nanoparticles were deposited in the acidic region of pH 2 to 5. This indicates that hydrogen ions in the sulfuric acid electrolyte aqueous solution are involved in the deposition of platinum nanoparticles.

Example 2

Unlike in Example 1, a carbon black sheet with a thin layer of platinum nanoparticles was manufactured by maintaining the pH of the platinum nanoparticle suspension electrolyte at 2 and changing the dwell time $t_{on}$ from 0.15 sec to 0.75 sec. FE-SEM images of carbon black sheets with a thin layer of platinum nanoparticles manufactured are shown in FIGS. 12 to 15. As shown in FIGS. 12 to 15, it was confirmed that platinum nanoparticles were deposited on the carbon black layer under all the dwell time conditions, and the amount of platinum nanoparticles deposited could be controlled by controlling the dwell time.

Comparative Example 1

Figure 16:
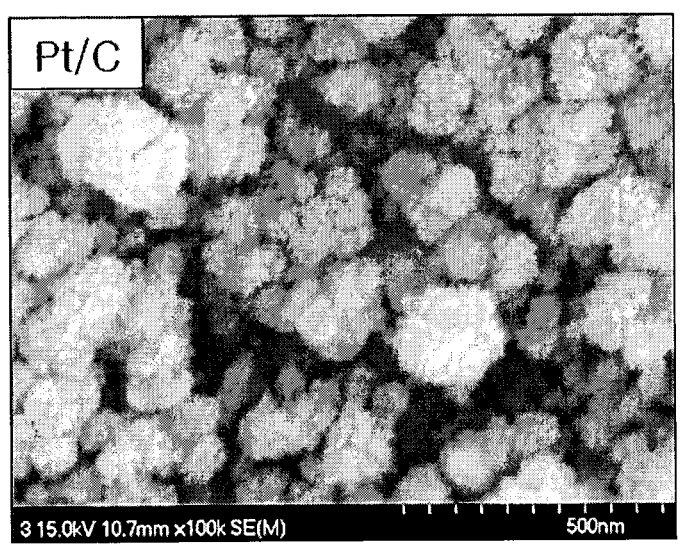
FIG. 16 is an FE-SEM image of a carbon black sheet (Pt/C) manufactured in comparative Example 1.

Unlike in Example 1, a direct current electroplating ($t_{off}$=0), by which the dwell time is set at 1 sec while the pH of the platinum nanoparticle suspension electrolyte is maintained at 2, that is, the direct current is continuously applied, was used to manufacture a carbon black sheet with platinum nanoparticles deposited. An FE-SEM image of a carbon black sheet in which the prepared platinum nanoparticles were deposited is shown in FIG. 16. As shown in FIG. 16, the direct current electroplating does not allow platinum nanoparticles to be uniformly deposited in the form of a thin layer on the carbon black sheet. However, a large volume of aggregated platinum nanoparticles were deposited.

[Test of Methanol Oxidation Reactivity]

Figure 17:
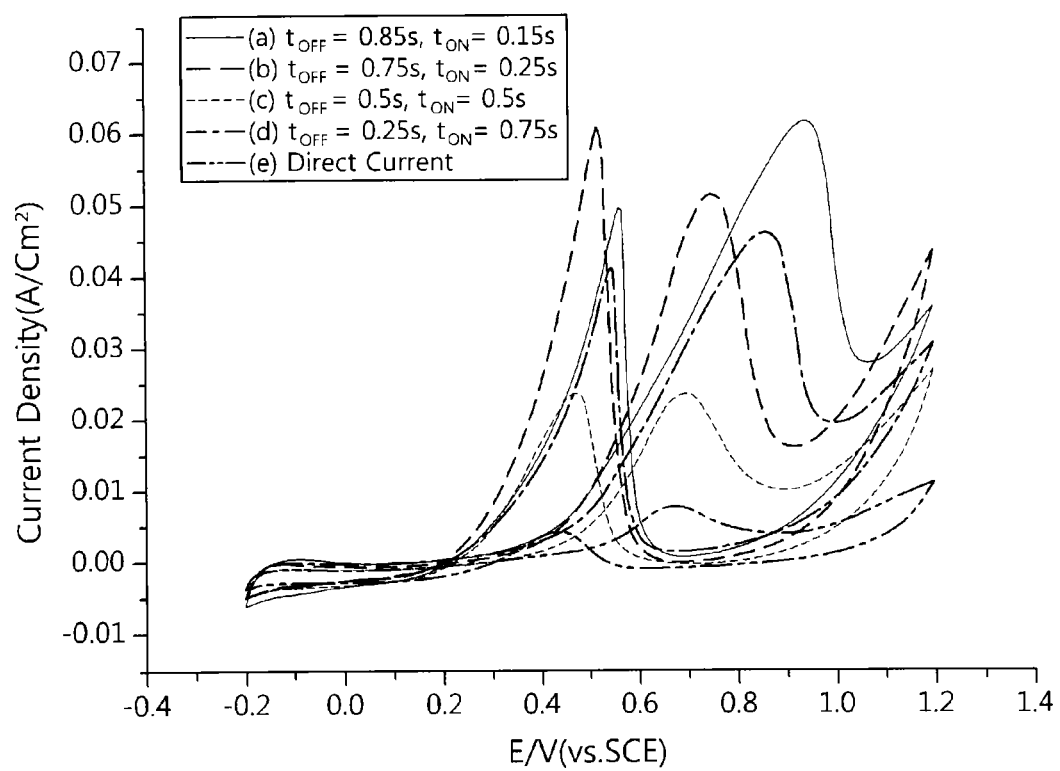
FIG. 17 is a view illustrating a change in activity of a carbon black sheet (Pt/C) manufactured in Example 2.

In order to measure the activities of platinum nanoparticle catalysts on the carbon black in Example 2 and Comparative Example 1, the cyclic voltammetry was used to test the methanol oxidation reactivity in a mixed solution of 1 M $H_2SO_4$ and 1 M $CH_3OH$, and the result is shown in FIG. 17.

FIGS. 17 (a) to (d) show results obtained by changing the dwell time $t_{on}$ by pulse electroplating in Example 2, and FIG. 17 (e) is a result obtained by using the direct current electroplating in Comparative Example 1. Two peaks in the cyclic voltammetry curve indicate an activity against the methanol oxidation reaction, meaning that the higher the activity of the platinum catalyst is, the higher the intensity of the peak.

Results obtained by using pulse electroplating in FIGS. 17 (a) to (d) are all higher in activity than a result obtained by using direct current electroplating in FIG. 17 (e), and the platinum catalyst with a dwell time of 0.15 sec and 0.25 sec, at which the dispersion of platinum is particularly good, exhibited a relatively good activity.

Example 3

Unlike in Example 1, a gold (Au) nanoparticle suspension electrolyte was used to prepare a carbon black sheet with a thin layer of gold nanoparticles instead of the platinum nanoparticle suspension electrolyte.

In this case, $HAuCl_4 4H_2O$ and sodium citrate were used as a starting material for synthesis of a gold nanoparticle colloid and a reducing agent, respectively. In order to synthesize the gold nanoparticle colloid, 1% of $HAuCl_4 4H_2O$ was first prepared, 1 ml of the reagent was diluted in 499 ml of $H_2O$, the resulting aqueous solution was vigorously stirred while being heated to about 99° C., and then 28 ml of 1% sodium citrate was added for preparation. The gold colloid synthesized had an average diameter of 15 nm.

A mixed solution of 1 M $H_2SO_4$ and 1 M $CH_3OH$ was used as an electrolyte solution, and 50 ml of a gold nanoparticle colloid solution was mixed with 200 ml of the electrolyte solution to prepare a gold (Au) nanoparticle suspension electrolyte. Gold nanoparticles were deposited on a carbon black sheet in a gold nanoparticle suspension electrolyte in which its pH was adjusted to 6 by maintaining $I_{on}$ and $I_{off}$ at 30 mA/cm$^2$ and 0 mA/cm$^2$, respectively and setting $t_{on}$ at 0.5 sec to prepare a carbon black sheet with a thin layer of gold nanoparticles, and the FE-SEM image is shown in FIG. 18.

Figure 18:
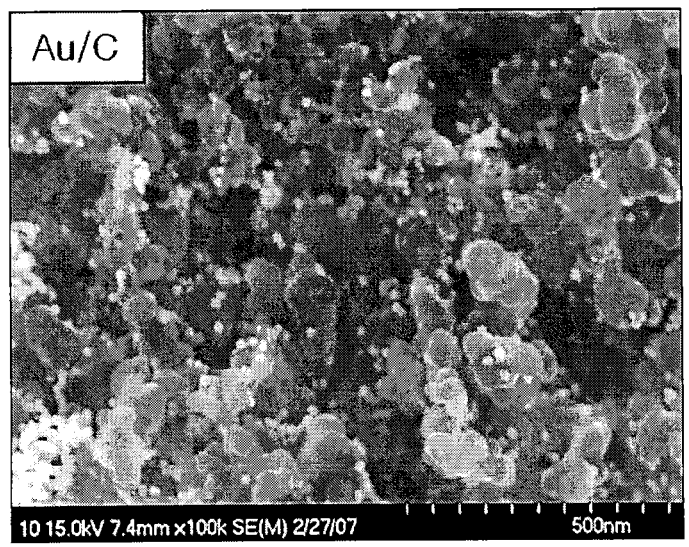
FIG. 18 is an SEM image of a carbon black sheet (Au/C) manufactured in Example 3.

As shown from the SEM image in FIG. 18, it is confirmed that gold nanoparticles with a size of about 15 nm were uniformly deposited on the carbon black layer.

Example 4

Figure 19:
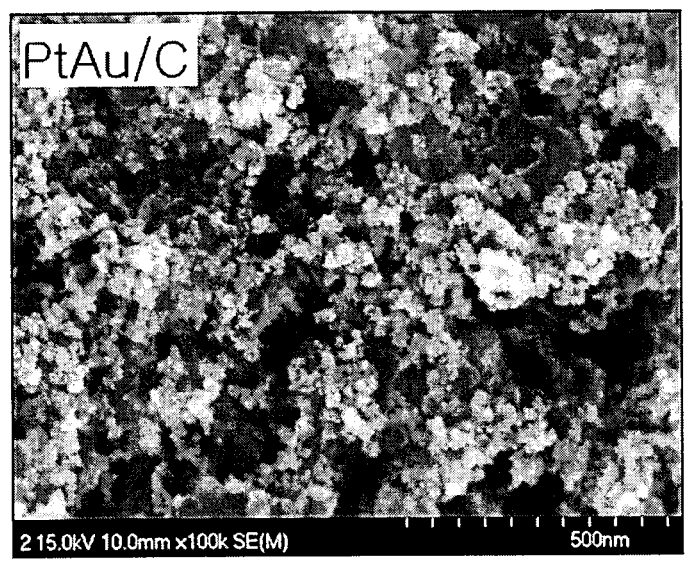
FIG. 19 is an SEM image of a carbon black sheet (Pt—Au/C) manufactured in Example 4.

A carbon black sheet with a thin layer of gold nanoparticles was manufactured in the same manner as in Example 3, then a complex deposition of platinum nanoparticles was performed on a gold nanoparticle-supported carbon black by maintaining $I_{on}$ and $I_{off}$ at 30 mA/cm$^2$ and 0 mA/cm$^2$, respectively, as in Example 1, setting $t_{on}$ at 0.25 sec, and adjusting the pH of an electrolyte in which platinum nanoparticles were suspended to 2, and the FE-SEM image is shown in FIG. 19.

It is confirmed from the SEM image in FIG. 19 that platinum nanoparticles were deposited simultaneously on the carbon black layer and on gold nanoparticles on the carbon black layer, and it is determined that platinum nanoparticles were deposited more on gold nanoparticles with a higher electric conductivity than on the carbon black layer with a lower electric conductivity to form complex nanoparticles. When pulse electroplating and a metal nanoparticle suspension electrolyte are used together, it can be confirmed that various forms of complex nanoparticles may be formed.

The invention claimed is:

1. A method of preparing a carbon black sheet, the method comprising:
    forming a carbon black layer on a surface of a carbon paper to prepare a carbon black electrode; and
    forming a catalyst nanoparticle layer on the carbon black electrode wherein the step of forming the catalyst nanoparticle layer comprises:
        preparing a colloid suspension of the catalyst nanoparticles by mixing the catalyst nanoparticles and an electrolyte solution such that the catalyst nanoparticles are dispersed in the electrolyte solution as a colloid suspension of catalyst nanoparticles;
        adding the carbon black electrode with carbon black layer into the colloid suspension of catalyst nanoparticles,
        applying pulse electric power to the colloid suspension of catalyst nanoparticles such that catalyst nanoparticles of the colloid suspension are moved onto the carbon layer and deposited thereon by electrophoresis, wherein the carbon black electrode is a negative electrode.

2. The method of claim 1, wherein the suspension of metal particles has a pH of 6 or less.

3. The method of claim 1, wherein a complex metal nanoparticle thin layer is formed from the catalyst nanoparticle layer by:
    providing a nanoparticle suspension electrolyte of a different metal from the metal of the catalyst metal nanoparticle layer;
    contacting the nanoparticle suspension electrolyte with the catalyst nanoparticle layer; and
    subjecting nanoparticles of the nanoparticle suspension electrolyte to electrophoresis deposition to form the complex metal nanoparticle thin layer.

4. The method of claim 1, wherein an amount of the metal nanoparticles deposited by the pulse electroplating is controlled by controlling the current density and dwell time of electric power applied, the concentration of metal nanoparticles in the suspension, pH, temperature, and concentration of the metal nanoparticles.

5. The method of claim 1, wherein depositing the catalyst nanoparticles on the carbon black layer of the electrode is only performed by electrophoresis phenomenon.

6. The method of claim 1, further comprising forming a carbon black sheet with multiple layers of the metal nanoparticles.

7. The method of claim 6, further comprising forming polymer membrane electrode assembly for a fuel cell.

8. A method of preparing carbon black layers comprising:
    forming a carbon black layer on a surface of a carbon paper to prepare a carbon black electrode; and
    forming a catalyst nanoparticle layer on the carbon black electrode, wherein the step of forming the catalyst nanoparticle layer consists of:
        preparing a colloid suspension of the catalyst nanoparticles by mixing the catalyst nanoparticles and an electrolyte solution such that the catalyst nanoparticles are dispersed in the electrolyte solution as a colloid suspension of catalyst nanoparticles;
        adding the carbon black electrode with carbon black layer into the colloid suspension of catalyst nanoparticles,
        applying pulse electric power to the colloid suspension of catalyst nanoparticles such that catalyst nanoparticles of the colloid suspension are moved onto the carbon layer and deposited thereon by electrophoresis, wherein the carbon black electrode is a negative electrode.

9. The method of claim 8, wherein the suspension of metal particles has a pH of 6 or less.

10. The method of claim 8, wherein a complex metal nanoparticle thin layer is formed from the catalyst nanoparticle layer by:
    providing a nanoparticle suspension electrolyte of a different metal from the metal of the catalyst metal nanoparticle layer;
    contacting the nanoparticle suspension electrolyte with the catalyst nanoparticle layer; and
    subjecting nanoparticles of the nanoparticle suspension electrolyte to electrophoresis deposition to form the complex metal nanoparticle thin layer.

11. The method of claim 8, wherein an amount of the metal nanoparticles deposited by the pulse electroplating is controlled by controlling the current density and dwell time of electric power applied, the concentration of metal nanoparticles in the suspension, pH, temperature, and concentration of the metal nanoparticles.

12. The method of claim 8, further comprising forming a carbon black sheet with multiple layers of the metal nanoparticles.

13. The method of claim 12, further comprising forming polymer membrane electrode assembly for a fuel cell.

* * * * *